(12) United States Patent
Katayama

(10) Patent No.: US 7,168,552 B2
(45) Date of Patent: Jan. 30, 2007

(54) ARTICLE JOINING SYSTEM

(75) Inventor: Daisuke Katayama, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 11/294,623

(22) Filed: Dec. 5, 2005

(65) Prior Publication Data

US 2006/0155420 A1 Jul. 13, 2006

(30) Foreign Application Priority Data

Dec. 27, 2004 (JP) .............................. 2004-375152

(51) Int. Cl.
  *B65G 47/68* (2006.01)
  *B65G 43/00* (2006.01)
  *G06F 7/00* (2006.01)

(52) U.S. Cl. .............................. 198/460.1; 198/418.7; 198/459.8; 198/575; 198/577; 198/579; 198/601; 198/792; 700/230

(58) Field of Classification Search ............. 198/418.7, 198/459.8, 460.1, 461.1, 575, 577, 579, 601, 198/792; 700/230
See application file for complete search history.

(56) References Cited

U.S. PATENT DOCUMENTS

| | | | | |
|---|---|---|---|---|
| 4,003,466 A | * | 1/1977 | Muth et al. .................. | 198/452 |
| 4,634,551 A | * | 1/1987 | Burns et al. .................. | 510/313 |
| 5,228,558 A | * | 7/1993 | Hall ............................ | 198/784 |
| 5,971,134 A | * | 10/1999 | Trefz et al. ............... | 198/460.1 |
| 6,378,687 B1 | * | 4/2002 | Lem et al. ............. | 198/349.95 |
| 6,412,621 B1 | * | 7/2002 | De Vree et al. ......... | 198/347.4 |
| 6,513,641 B1 | * | 2/2003 | Affaticati et al. ........... | 198/357 |
| 6,522,944 B2 | * | 2/2003 | Wielebski et al. .......... | 700/224 |
| 6,648,124 B1 | * | 11/2003 | Garvey ..................... | 198/418.6 |
| 6,659,264 B2 | * | 12/2003 | Pelka .......................... | 198/456 |
| 6,737,600 B2 | * | 5/2004 | Takizawa .................... | 209/583 |
| 6,843,362 B2 | * | 1/2005 | Tachibana et al. ....... | 198/460.1 |
| 6,873,882 B2 | * | 3/2005 | Tachibana et al. ......... | 700/230 |
| 6,918,484 B2 | * | 7/2005 | Affaticati et al. ........... | 198/357 |
| 7,035,714 B2 | * | 4/2006 | Anderson et al. .......... | 700/228 |
| 7,128,197 B2 | * | 10/2006 | Haan et al. ............... | 198/347.4 |

FOREIGN PATENT DOCUMENTS

| JP | 08-188223 | 7/1996 |
|---|---|---|
| JP | 2000-095338 | 4/2000 |

* cited by examiner

Primary Examiner—Douglas Hess
(74) Attorney, Agent, or Firm—Kusner & Jaffe

(57) ABSTRACT

A conveyance path for conveying articles though an accumulation conveyor, then through a carry-out conveyor, and then through a joining station is disclosed. After a flow of articles and at a time when there are no articles present on a portion of the conveyance path, an article spacing control of the carry-out conveyor and the carry-out of an article to the joining station are stopped. In the conveyance path where an article is present on a portion of the conveyance path, the speed control of an article in the accumulation conveyor is conducted at a speed higher than a constant speed, the speed control of the carry-out conveyor is conducted at a speed higher than the constant speed, and the article spacing control is conducted at a spacing narrower than a prescribed spacing.

4 Claims, 5 Drawing Sheets

FIG. 3

CONVEYANCE PATH L1

| | REAR MIDSTREAM CONVEYOR 19B | FRONT MIDSTREAM CONVEYOR 18A | REAR UPSTREAM CONVEYOR 15A | FRONT UPSTREAM CONVEYOR 14A | ACCUMULATION CONVEYOR 3A |
|---|---|---|---|---|---|
| FIRST CONTROL SIGNAL | 100m/min | 85m/min | 85m/min (HIGH SPEED) (ARTICLE SPACING 320mm) | 75m/min (HIGH SPEED) | 75m/min (HIGH SPEED) |
| SECOND CONTROL SIGNAL | STOP | STOP | 75m/min (CONSTANT SPEED) (ARTICLE SPACING CONTROL IS NOT CONDUCTED) | 65m/min (CONSTANT SPEED) | 65m/min (CONSTANT SPEED) |
| THIRD CONTROL SIGNAL | 100m/min | 85m/min | 75m/min (CONSTANT SPEED) (ARTICLE SPACING 666mm) | 65m/min (CONSTANT SPEED) | 65m/min (CONSTANT SPEED) |

CONVEYANCE PATH L2

| | REAR MIDSTREAM CONVEYOR 19B | FRONT MIDSTREAM CONVEYOR 18B | REAR UPSTREAM CONVEYOR 15B | FRONT UPSTREAM CONVEYOR 14B | ACCUMULATION CONVEYOR 3B |
|---|---|---|---|---|---|
| FIRST CONTROL SIGNAL | STOP | STOP | 75m/min (CONSTANT SPEED) (ARTICLE SPACING CONTROL IS NOT CONDUCTED) | 65m/min (CONSTANT SPEED) | 65m/min (CONSTANT SPEED) |
| SECOND CONTROL SIGNAL | 100m/min | 85m/min | 85m/min (HIGH SPEED) (ARTICLE SPACING 320mm) | 75m/min (HIGH SPEED) | 75m/min (HIGH SPEED) |
| THIRD CONTROL SIGNAL | 100m/min | 85m/min | 75m/min (CONSTANT SPEED) (ARTICLE SPACING 666mm) | 65m/min (CONSTANT SPEED) | 65m/min (CONSTANT SPEED) |

ARTICLE JOINING SYSTEM

FIELD OF THE INVENTION

The present invention relates to an article joining system for joining articles conveyed along a plurality of conveyance paths.

BACKGROUND OF THE INVENTION

A conventional article joining system is disclosed in Japanese Patent Application Laid-open No. H8-188223.

The article joining apparatus disclosed in Japanese Patent Application Laid-open No. H8-188223 joins articles fed in from three conveying lines and comprises front conveyors, rear conveyors, and a collection conveyor.

The front conveyors are disposed in front (downstream side) in the conveying direction in each of the three conveying lines.

The rear conveyors are disposed behind (upstream side) in the conveying direction of the front conveyors in each of the three conveying lines.

One collection conveyor is disposed in front of the front conveyors close thereto.

With the above-described configuration, the rear conveyors to which the articles are not fed are operated at a "low speed".

When the articles are fed to any one of a plurality of the conveying lines, the rear conveyor of the conveying line in which the articles were fed is operated at a "high speed". Therefore, the articles present on the conveying line are conveyed at a high speed.

Furthermore, when the articles are fed to any one of a plurality of conveying lines ahead of the others, if the articles are introduced into one of the other conveying lines, the conveying line into which the articles were introduced still operates at a "low speed" and is operated at a "high speed" after the prescribed time elapses. As a result, the rear conveyor of the conveying line in which the articles have been conveyed ahead of the other lines has already been operated at a "high speed" before the rear conveyor of the conveying line into which the articles were introduced is operated at a "high speed", the articles that were conveyed ahead of others have already been fed out to an accumulation conveyor, and the articles located on the conveying line that was switched to a "high speed" are fed out at a high speed following those articles that have been fed out. Therefore, the articles fed in a plurality of rows can be orderly joined in one row.

However, with the above-described conventional article joining system, when articles are conveyed with one conveying line, no control is conducted to enhance the conveying capacity of the conveyor in this conveying line. Therefore, the difference in the number of conveyed articles appears between the case where the articles are conveyed with one conveying line and the case where the articles are conveyed with a plurality of conveying lines. The resultant problem is that a constant conveying capacity cannot be maintained.

SUMMARY OF THE INVENTION

An advantage of the present invention is an article joining system that can maintain a constant conveying capacity by conducting speed control together with article spacing control.

In the article joining system in accordance with the present invention each conveyance path comprises an accumulation conveyor which successively accumulates the articles that have been conveyed in from the upstream side, conducts a speed control for conveying at a constant speed or a speed higher than the constant speed, and successively feeds the accumulated articles out to the downstream side, and a carry-out conveyor connected to the downstream end of the accumulation conveyor, conducting a speed control for conveying the articles conveyed in from the accumulation conveyor at a constant speed or a speed higher than the constant speed, conducting an article spacing control for conveying the respective articles with the prescribed spacing or a spacing narrower than the prescribed spacing, determining a state in which the articles in each conveyance path are conveyed out to the joining apparatus and conducting carry-out control for carrying out the articles to the joining apparatus.

When an article is conveyed in a plurality of conveyance paths, a speed control is conducted such that the article that has been conveyed in is conveyed at a constant speed in the accumulation conveyor, and a speed control is conducted such that the article that has been conveyed in from the accumulation conveyor is conveyed at a constant speed and an article spacing control is conducted such that each articles are conveyed with the prescribed spacing in the carry-out conveyor.

Furthermore, when an article is conveyed only by any one conveyance path, the article spacing control and carry-out control are stopped in the carry-out conveyor in the conveyance path where the conveyance of article is not conducted, a speed control is conducted such that the article that has been conveyed in is conveyed at a high speed in the accumulation conveyor in the conveyance path where the article is conveyed, and a speed control is conducted such that the article conveyed in from the accumulation conveyor is conveyed at a high speed and a article spacing control is conducted such that each articles are conveyed with a spacing narrower than the prescribed spacing in the carry-out conveyor in the conveyance path where the article is conveyed.

BRIEF DESCRIPTION OF THE DRAWINGS

FIG. 3 illustrates a conveying speed of conveyors in each conveyance path at each control signal of the embodiment of the present invention;

DESCRIPTION OF PREFERRED EMBODIMENTS

The article joining system of an embodiment of the present invention will be described below with reference to the appended drawings.

The article joining system of an embodiment of the present invention is designed for joining and carrying out the article conveyed from a plurality of conveyance paths. The side where the article is conveyed in will be referred to as a front side, the side where the article is conveyed out will be called a rear side, and the longitudinal direction (front-rear direction) of the accumulation conveyor, which is article convey-in means, and carry-out conveyors 4A, 4B, which are article carry-out means, will be called a article conveying direction.

Figure 1:
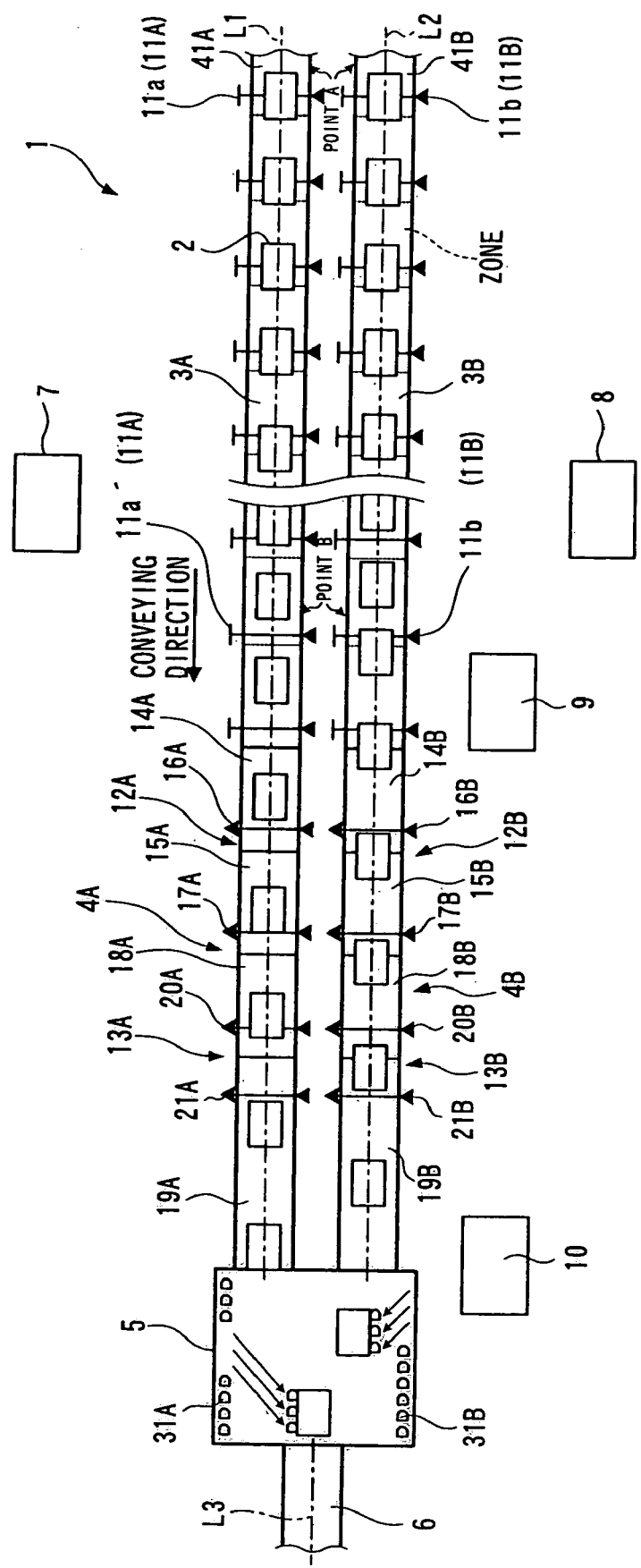
FIG. 1 is a plan view of an article joining system in a state where the article is joined according to an embodiment of the present invention.
Figure 2:
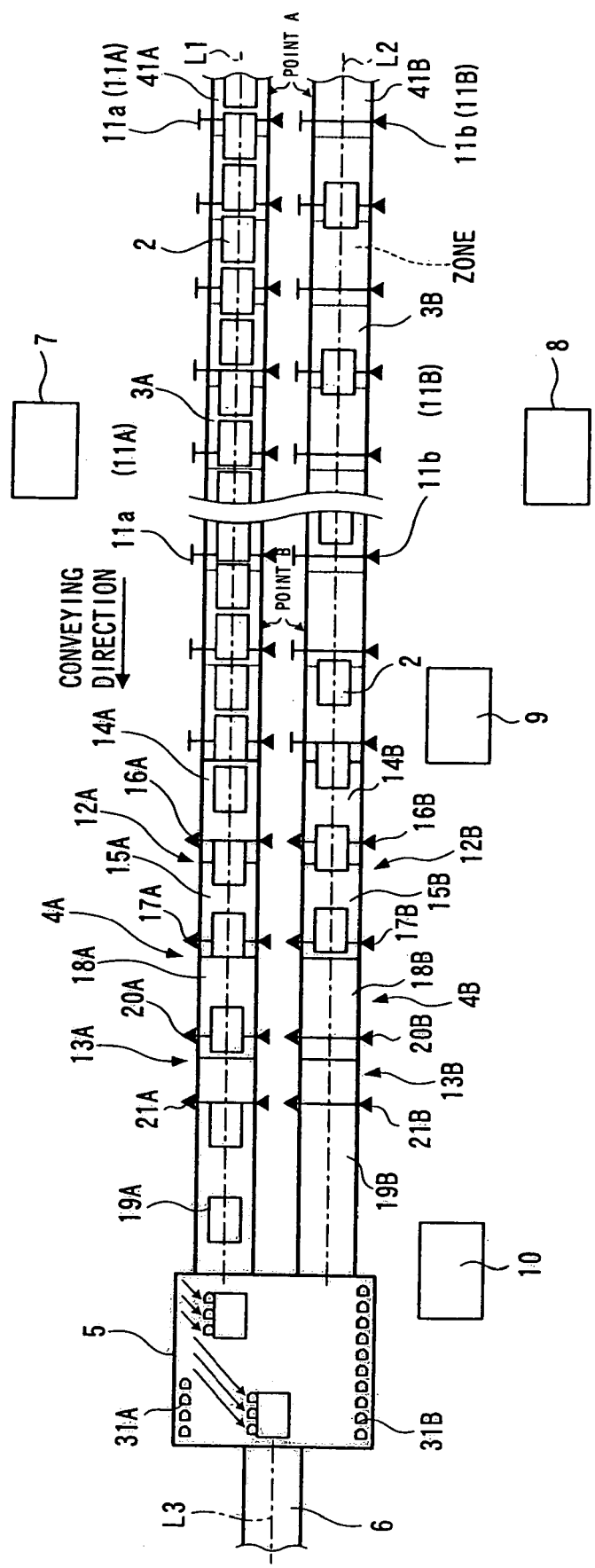
FIG. 2 is a plan view of the article joining system in a state where article joining is not conducted, according to the embodiment of the present invention.

As shown in FIG. 1 and FIG. 2, the article joining system 1 of the present embodiment comprises two accumulation conveyors 3A, 3B, two carry-out conveyors 4A, 4B, a transfer unit 5 (an example of the joining apparatus), a downstream conveyor 6 (an example of the article conveying apparatus), a first control device 7 that controls the accumulation conveyor 3A, a second control device 8 that controls the accumulation conveyor 3B, a third control device 9 that controls the two carry-out conveyors 4A, 4B, and a fourth control device 10 for controlling the transfer unit 5.

A conveyance path L1 to the transfer unit 5 is formed by the accumulation conveyor 3A and carry-out conveyor 4A. A conveyance path L2 to the transfer unit 5 is formed by the accumulation conveyor 3B and carry-out conveyor 4B. A conveyance path L3 is formed by the downstream conveyor 6.

The accumulation conveyors 3A, 3B are arranged parallel to the upstream side in the conveying direction. The accumulation conveyors 3A, 3B comprise a plurality of connected zones for successively accumulating an article 2 conveyed in from the upstream side and successively feeding the accumulated article 2 out to the downstream side. Furthermore, they have a function of successively accumulating the article 2 conveyed in from the upstream side, conducting a speed control to convey the article at a constant speed or at a speed higher than the constant speed, and successively feeding the accumulated article 2 out to the downstream side. As shown in FIG. 3, the conveying speed of a constant-speed mode of the accumulation conveyors 3A, 3B is set to 65 m/min and the conveying speed in a high-speed mode is set to 75 m/min.

In each accumulation conveyor 3A, 3B, a plurality of opposite-type photoelectric switches (an example of the detection device) 11A, 11B for detecting the passing article 2 are provided downstream of each zone. Of a plurality of photoelectric switches 11A, 11B provided in the accumulation conveyors 3A, 3B, the photoelectric switches provided in zones 41A, 41B in the prescribed point A on the upstream side are taken as photoelectric switches 11a, 11b. Furthermore, the photoelectric switches provided in zones 42A, 42B in the prescribed point B on the downstream of the point A are taken as photoelectric switches 11a', 11b'.

The two aforementioned carry-out conveyors 4A, 4B are connected to the downstream ends of the accumulation conveyors 3A, 3B, respectively. Speed control is conducted to convey the article 2 conveyed in from the accumulation conveyors 3A, 3B at a constant speed or a high speed, article spacing control is conducted to convey the article 2 with a prescribed spacing or a spacing that is narrower than the prescribed spacing, and carry-out control is conducted to determine the state of conveying the article 2 out from conveyance paths L1, L2 to the transfer unit 5 and to carry out the article 2 to the transfer unit 5 with a prescribed spacing or a spacing that is narrower than the prescribed spacing.

Those carry-out conveyors 4A, 4B comprise upstream conveyors 12A, 12b, which are first carry-out means, and midstream conveyors 13A, 13B, which are second carry-out means.

The upstream conveyors 12A, 12B comprise front upstream conveyors 14A, 14B and rear upstream conveyors 15A, 15B.

The midstream conveyors 13A, 13B comprise front midstream conveyors 18A, 18B and rear midstream conveyors 19A, 19B.

The upstream conveyors 12A, 12B are connected to the downstream side of the accumulation conveyors 3A, 3B, respectively. Furthermore, a article spacing control is conducted to convey the article 2 to the downstream side with a prescribed spacing or a spacing that is narrower than the prescribed spacing, while accelerating the article successively conveyed in from the accumulation conveyors 3A, 3B. Furthermore, as shown in FIG. 3, the conveying speed of a constant-speed mode of the front upstream conveyors 14A, 14B is set to 65 m/min and 75 m/min in a high-speed mode. And the conveying speed of a constant-speed mode of the rear upstream conveyors 15A, 15B is set to 75 m/min and 85 m/min in a high-speed mode. The spacing between pieces of article 2 in a constant-speed mode is 666 mm and the spacing between the pieces of article 2 in a high-speed mode is 320 mm.

Photoelectric switches 16A, 16B for detecting the article 2 conveyed out from the front upstream conveyors 14A, 14B are arranged on the downstream side of the front upstream conveyors 14A, 14B, respectively. Furthermore, first photoelectric switches 17A, 17B {examples of the first detection apparatus for carry-out means (for article spacing control)} for detecting the article 2 carried out from the rear upstream conveyors 15A, 15B are arranged on the downstream side of the rear upstream conveyors 15A, 15B, respectively.

The midstream conveyors 13A, 13b are connected to the downstream sides of the upstream conveyors 12A, 12B, respectively. The carry-out control is conducted to determine the state of conveying the article 2 out from the conveyance paths L1, L2 to the transfer unit 5 and to carry out the article to the transfer unit 5 with a prescribed spacing or a spacing that is narrower than the prescribed spacing, while accelerating the article 2 conveyed from the upstream conveyors 12A, 12B. The conveying speed of the front midstream conveyors 18A, 18B is set to 85 m/min. The conveying speed of the rear midstream conveyors 19A, 19B is set to 100 m/min.

Photoelectric switches 20A, 20B for detecting the article 2 conveyed out from the front midstream conveyors 18A, 18B are arranged on the downstream side of the front midstream conveyors 18A, 18B, respectively. Photoelectric switches 21A, 21B {examples of the second detection unit for carry-out means (for carry-out control)} for detecting the article 2 conveyed out from the rear midstream conveyors 19A, 19B are arranged on the upstream side of the rear midstream conveyors 19A, 19B, respectively.

The transfer unit 5 comprises movable bodies 31A, 31B for moving the article 2 conveyed in from the conveyance paths L1, L2 to the conveyance path L3 and is connected to the downstream ends of the carry-out conveyors 4A, 4B. The article 2 that was conveyed in is parallel transferred by the movable bodies 31A, 31B to the conveyance path L3 positioned in the middle between the conveyance path L1 and conveyance path L2. The conveying speed is set to 120 m/min.

The downstream conveyor 6 is connected to the downstream side of the transfer unit 5 and conveys the article 2 conveyed out from the transfer unit 5. The conveying speed is set to 120 m/min.

Figure 4:
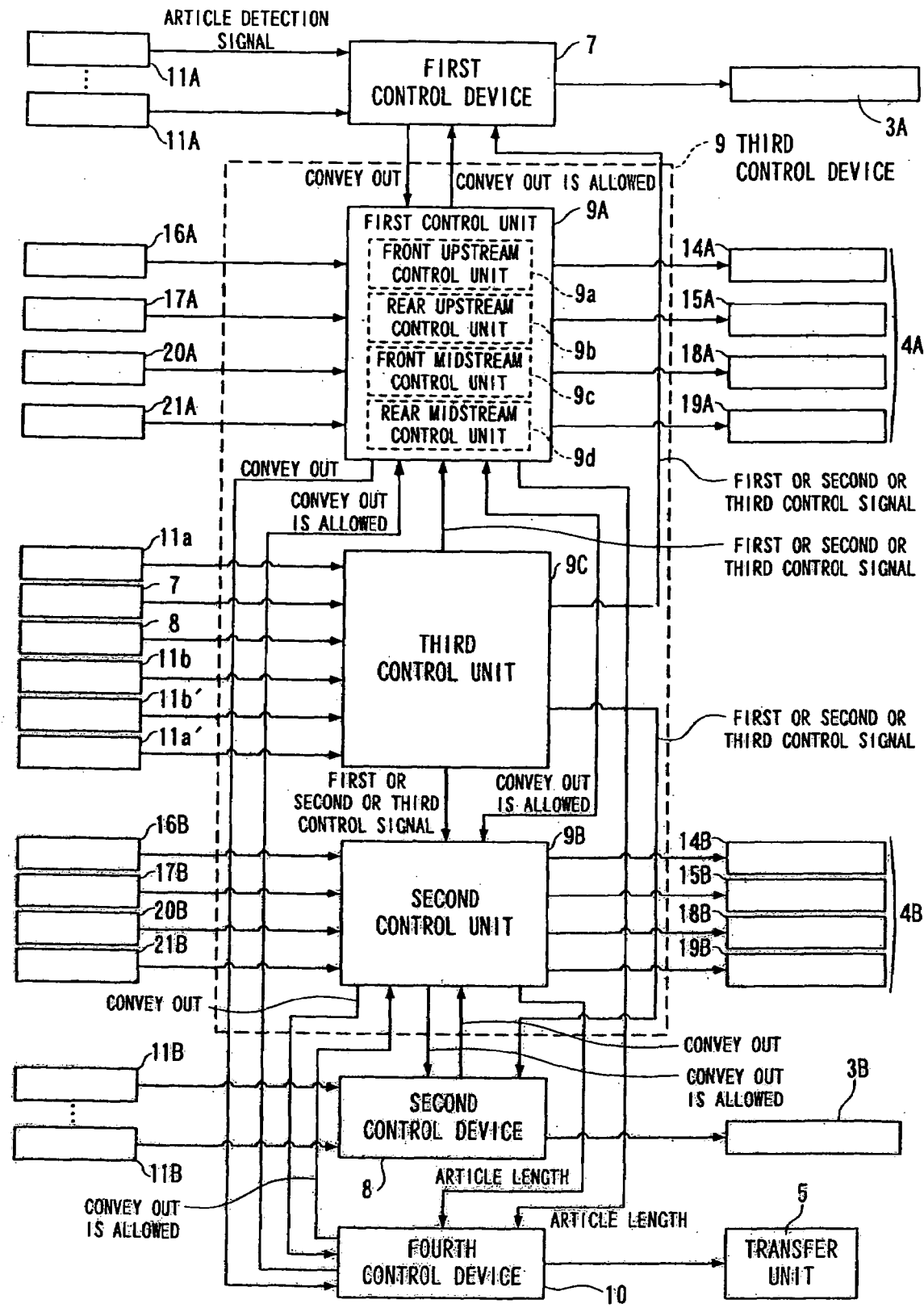
FIG. 4 is a block-diagram of a control device in the article joining system according to the embodiment of the present invention.

The first control device 7, second control device 8, third control device 9, and fourth control device 10 will be explained below with reference to FIG. 4.

The first control device 7, which controls the accumulation conveyor 3A, controls the accumulation conveyor 3A for each zone based on the article detection signals inputted from each photoelectric switches 11A and the convey-out allowed signal and first, second, and third control signals (described below in greater detail) inputted from the third control device 9, executes the speed control of the accumulation conveyor 3A in the above-described manner, and causes the article 2 conveyed in from the upstream side to the accumulation conveyor 3A to be accumulated and fed out successively to the carry-out conveyor 4A. The control of each zone is conducted in the following well-known manner. When the photoelectric switch 11A of a zone is OFF, a convey-out allowed signal is sent to the adjacent upstream zone and if a convey out signal is sent from the upstream adjacent zone, the zone is actuated, the article 2 is received, the operation is stopped once the reception of the article 2 is confirmed by the detection signal of the photoelectric switch 11A, the convey-out allowed signal of the downstream adjacent zone is confirmed and if ON (allowed) is confirmed, the zone is actuated, the article 2 is convey out and simultaneously the convey-out signal is outputted to the downstream adjacent zone. In this process, the conveying speed of the article 2 is set based on the aforementioned first, second, and third control signals, and the operation of conveying the article 2 out from the very last downstream zone is executed when the convey-out allowed signal of the third control device 9 is ON.

More specifically, when the article 2 is conveyed by using the two conveyance paths L1, L2, the first control device 7 conducts the speed control to convey the article 2 that was conveyed in from the upstream side to the accumulation conveyor 3A at a constant speed inputted from the third control device 9 (when the below-described third control signal is inputted).

Furthermore, when the article 2 is conveyed by only one conveyance path, if the conveyance path where the article 2 is conveyed is L1, the accumulation conveyor 3A is speed controlled so as to convey the article at a high speed based on the signal inputted from the third control device 9 (when the below-described first control signal is inputted), and if the conveyance path where the article 2 is conveyed is L2, the accumulation conveyor 3A is speed controlled to convey the article at a constant speed (when the below described second control signal is inputted).

The second control device 8, which controls the accumulation conveyor 3B, controls the accumulation conveyor 3B for each zone based on the article detection signals inputted from each photoelectric switches 11B and convey-out allowed signal and first, second, and third control signals inputted from the third control device 9, executes the speed control of the accumulation conveyor 3B in the above-described manner, and causes the article 2 conveyed in from the upstream side to the accumulation conveyor 3B to be accumulated and fed out successively to the carry-out conveyor 4B. The control of each zone is conducted in the above-described manner.

More specifically, when the article 2 is conveyed by using the two conveyance paths L1, L2, the second control device 8 conducts the speed control to convey the article 2 that was conveyed in from the upstream side to the accumulation conveyor 3B at a constant speed inputted from the third control device 9 (when the below-described third control signal is inputted).

Furthermore, when the article 2 is conveyed by only one conveyance path, if the conveyance path where the article 2 is conveyed is L1, the accumulation conveyor 3B is speed controlled so as to convey the article at a constant speed (when the below-described first control signal is inputted), and if the conveyance path where the article 2 is conveyed is L2, the accumulation conveyor 3B is speed controlled to convey the article at a high speed based on the signal inputted from the third control device 9 (when the below described second control signal is inputted).

The third control device 9 of the two carry-out conveyors 4A, 4B comprises a first control unit 9A, a second control unit 9B, and a third control unit 9C. The first control unit 9A and second control unit 9B comprise a front upstream control unit 9a that controls the front upstream conveyors 14A, 14B, a rear upstream control unit 9b that controls the rear upstream conveyors 15A, 15B, a front midstream control unit 9c that controls the midstream conveyors 18A, 18B, and a rear midstream control unit 9d that controls the rear midstream conveyors 19A, 19B.

The first control unit 9A inputs the convey-out signal of the article 2 from the first control device 7, article detection signals from the photoelectric switch 16A, first photoelectric switch 17A, photoelectric switch 20A, and second photoelectric switch 21A, convey-out allowed signal from the second control unit 9B and fourth control device 10, and the below-described first, second, and third controls signals from the third control unit 9C. The conveying state of the article 2 in the accumulation conveyor 3A, carry-out conveyors 4A, 4B, and transfer unit 5 and the length of the article 2 that is being conveyed are detected from those signals. The convey-out allowed signal is outputted to the first control device 7 and the carry-out signal and article length data are then outputted to the fourth control device 10 and the drive control of the front upstream conveyor 14A, rear upstream conveyor 15A, front midstream conveyor 18A, and rear midstream conveyor 19A, speed control of the front upstream conveyor 14A and rear upstream conveyor 15A, load spacing control of the rear upstream conveyor 15A, and carry-out control of the rear midstream conveyor 19A are conducted.

More specifically, the front upstream control unit 9a that controls the front upstream conveyor 14A inputs the below-described first, second, and third control signals from the third control unit 9C, a convey-out signal of the article 2 from the first control device 7, a convey-out allowed signal (described below) from the rear upstream control unit 9b, and a article detection signal from the photoelectric switch 16A and detects the operation conditions. Then, it outputs the convey-out allowed signal to the first control device 7 and the convey-out signal to the rear upstream control unit 9b and conducts the speed control of the front upstream conveyor 14A based on the detected operation drive conditions. Thus, as shown in FIG. 3, the front upstream conveyor 14A is speed controlled to 75 m/min, which is a high speed, when the article 2 is conveyed only with the conveyance path L1 (when the below-described first control signal is inputted), speed controlled to 65 m/min, which is a constant speed, when the article 2 is conveyed only with the conveyance path L2 (when the below-described second control signal is inputted), and speed controlled to 65 m/min, which is a constant speed, when the article 2 is conveyed by using the two conveyance paths L1, L2 at the same time (when the below-described third control signal is inputted).

Furthermore, the rear upstream control unit 9b that controls the rear upstream conveyor 15A inputs the below-described first, second, and third control signals from the third control unit 9C, a convey-out signal from the front upstream control unit 9a, a convey-out allowed signal (described below) from the front midstream control unit 9c, and a the article detection signal from the first photoelectric switch 17A and detects the operation conditions. Then, it outputs the convey-out allowed signal to the front upstream control unit 9a and the convey-out signal to the front midstream control unit 9c, conducts the speed control of the rear upstream conveyor 15A and also conducts the article spacing control based on the detected operation drive conditions. Thus, as shown in FIG. 3, the rear upstream conveyor 15A is speed controlled to 85 m/min, which is a high speed, and article spacing controlled so that the spacing of the article 2 becomes 320 mm when the article 2 is conveyed only with the conveyance path L1 (when the below-described first control signal is inputted), speed controlled to 75 m/min, which is a constant speed, and stops the article spacing control when the article 2 is conveyed only with the conveyance path L2 (when the below-described second control signal is inputted), and stopped for the prescribed time (for example, for 1 sec) by inputting the below-described third control signal and then speed controlled to 75 m/min, which is a constant speed, and article spacing controlled so that the spacing of the article 2 becomes 666 mm (the conveyor may be also stopped for the prescribed time when a change is made from the first control signal to the third control signal), when the article 2 is conveyed by using the two conveyance paths L1, L2 at the same time. This article spacing control is conducted by carrying out the next piece of article 2 after the prescribed time calculated based on the conveying speed of the article 2 at this time has elapsed since the input of the article detection signal from the first photoelectric switch 17A to the rear upstream control unit 9b.

The front midstream control unit 9c that controls the front midstream conveyor 18A inputs the first, second, and third control signals from the third control unit 9C, a convey-out signal of the article 2 from the rear upstream control unit 9b, a convey-out allowed signal (described below) from the rear midstream control unit 9d, and a article detection signal from the photoelectric switch 20A and detects the operation conditions. Then, it outputs the convey-out allowed signal to the rear upstream control unit 9b and the convey-out signal to the rear midstream control unit 9d and conducts the speed control of the front midstream conveyor 18A based on the detected operation drive conditions. Thus, as shown in FIG. 3, the front midstream conveyor 18A is speed controlled to 85 m/min when the article 2 is conveyed only with the conveyance path L1 (when the below-described first control signal is inputted), stopped when the article 2 is conveyed only with the conveyance path L2 (when the below-described second control signal is inputted), and speed controlled to 85 m/min when the article 2 is conveyed by using the two conveyance paths L1, L2 at the same time (when the below-described third control signal is inputted).

Furthermore, the rear midstream control unit 9d that controls the rear midstream conveyor 19A inputs the first, second, and third control signals from the third control unit 9C, a convey-out signal of the article 2 from the front midstream control unit 9c, a convey-out allowed signal (described below) from the fourth control device 10, a convey-out allowed signal (described below) from the second control unit 9B, and a article detection signal from the second photoelectric switch 21A and detects the operation conditions. Then, it outputs the convey-out allowed signal to the front midstream control unit 9c, the convey-out allowed signal to the second control unit 9B, the convey-out signal to the fourth control device 10, and the article length data to the fourth control device 10 and also conducts the carry-out control of the article 2 of the rear midstream conveyor 19A based on the detected operation drive conditions. Thus, as shown in FIG. 3, the rear midstream conveyor 19A is speed controlled to 100 m/min and the article 2 is carry-out controlled when the article 2 is conveyed only with the conveyance path L1 (when the below-described first control signal is inputted), the conveyor is stopped when the article 2 is conveyed only with the conveyance path L2 (when the second control signal is inputted), and the conveyor is stopped for the prescribed time (for example, for 1 sec) by inputting the below-described third control signal (the conveyor may be also stopped for the prescribed time when a change is made from the first control signal to the third control signal) and then speed controlled to 100 m/min and the article 2 is carry-out controlled when the article 2 is conveyed by using the two conveyance paths L1, L2 at the same time. The aforementioned article length data are generated by calculating the length of the article 2 from the conveying speed of the rear midstream conveyor 19A and the time interval in which the rear midstream control unit 9d inputs the article detection signal from the second photoelectric switch 21A. The transfer unit 5 determines the number of movements of the movable bodies 31A, 31B based on the length of the article 2.

Furthermore, with the carry-out control, when the article 2 is conveyed only with the conveyance path L1, each piece of article 2 with a spacing between the pieces of article 2 being 320 mm is directly conveyed to the transfer unit 5. Furthermore, when the article 2 is conveyed by using the two conveyance paths L1, L2 at the same time, the carry-out control is conducted by conveying the article 2 from the arrangement point of the second photoelectric switch 21A of the rear midstream conveyor 19A correspondingly to the convey-out allowed signal outputted from the second control unit 9B after the convey-out allowed signal has been inputted from the second control unit 9B that carries out the control of the carry-out conveyor 4B, that is, after the prescribed time has elapsed since the end of the input of the article detection signal from the second photoelectric switch 21B to the second control unit 9B. Furthermore, the carry out permission signal is outputted to the second control unit 9B after the prescribed time interval based on the conveying speed of the rear midstream conveyor 19A and the spacing of article 2 (the spacing set in advance so as to prevent the pieces of article 2 carried out from the rear midstream conveyors 19A, 19B from colliding with each other) has elapsed since the end of the input of the article detection signal from the second photoelectric switch 21A of the rear midstream conveyor 19A.

The second control unit 9B inputs a convey-out signal from the second control device 8, article detection signals from the photoelectric switch 16B, first photoelectric switch 17B, photoelectric switch 20B, and second photoelectric switch 21B, convey-out allowed signals from the first control unit 9A and fourth control device 10, and first, second, or third control signal form the third control unit 9C and detects the conveying state of the article 2 in the accumulation conveyor 3B, carry-out conveyors 4A, 4B, and transfer unit 5 and the length of each piece of article 2 from those signals. Furthermore, it outputs the convey-out allowed signal to the first control device 7 and the carry out signal and article length data to the fourth control device 10 and carries out the drive control of the front upstream conveyor 14B, rear upstream conveyor 15B, front midstream conveyor 18B, and rear midstream conveyor 19B, speed control of the front upstream conveyor 14B and rear upstream conveyor 15B, article spacing control of the rear upstream conveyor 15B, and carry-out control of the rear midstream conveyor 19B. The front upstream control unit 9a, rear upstream control unit 9b, front midstream control unit 9c, and rear midstream control unit 9d of the second control unit 9B are identical to those of the above-described first control unit 9A and the explanation thereof is herein omitted.

Figure 5:
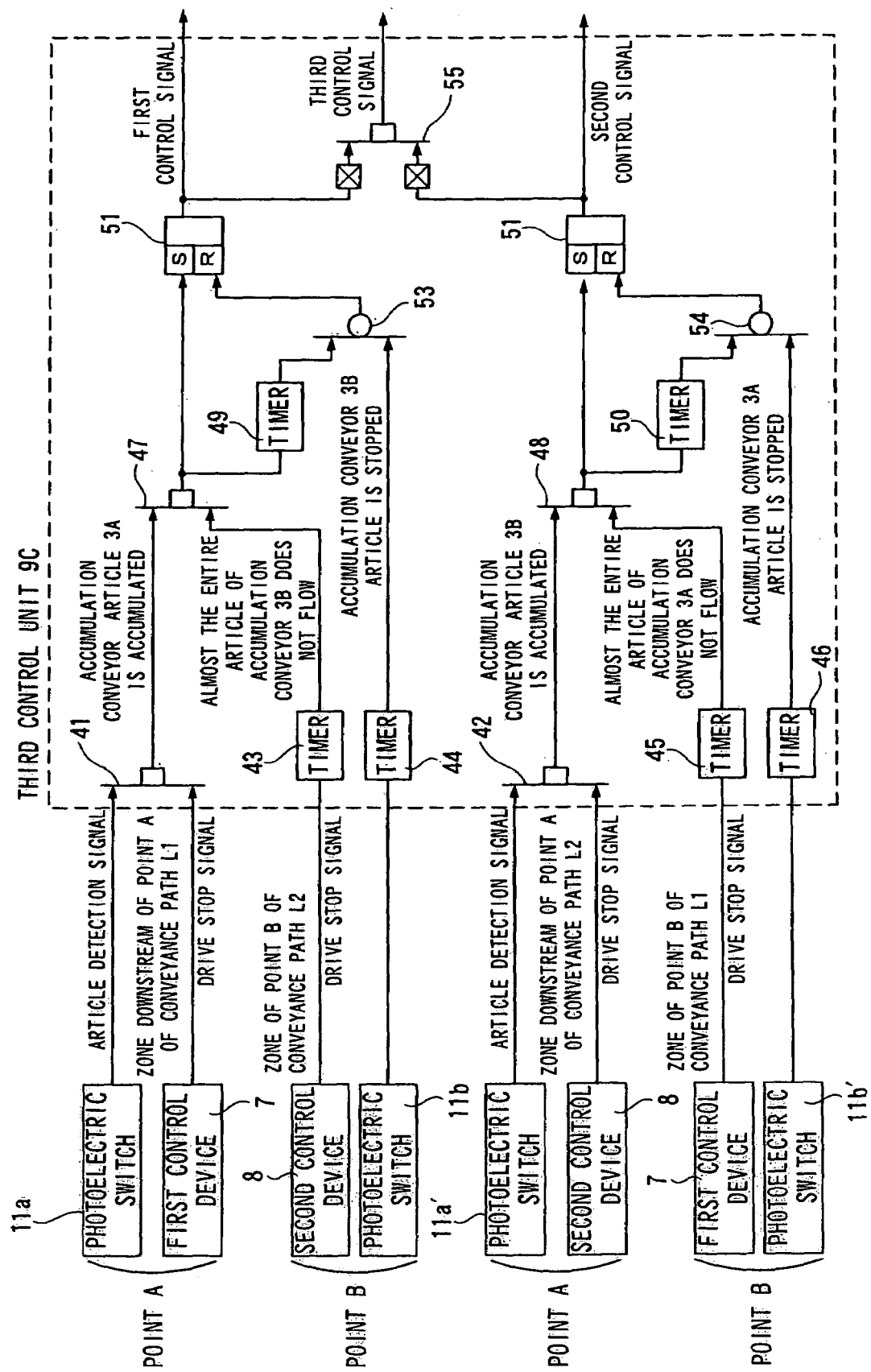
FIG. 5 is a block diagram of a third control device in the article joining system according to the embodiment of the present invention.

Article detection signals of the photoelectric switches 11a, 11b of point A, article detection signals of photoelectric switches 11a', 11b' of point B, an operation termination signal for a zone that is next downstream of the zone of point A of the conveyance path L1 and an operation termination signal of the zone of point B that are outputted from the first control device 7, and an operation termination signal for a zone that is next downstream of the zone of point A of the conveyance path L2 and an operation termination signal of the zone of point B that are outputted from the second control device 8 are inputted into the third control unit 9C, this section having the configuration as shown in FIG. 5.

Thus, the third control unit 9C comprises AND 41, 42, 47, 48, 55, timers 43, 44, 45, 46, 49, 50, RS flip-flops 51, 52, and OR 53, 54.

The AND 41 is a logical AND circuit that detects the conveying state (stop) of the article 2 in point A of the conveyance path L1, that is, a circuit for logically adding the article detection signal of the photoelectric switch 11a of point A and the operation termination signal of a zone that is next downstream of the zone of point A that is outputted from the first control device 7.

The AND 42 is a logical AND circuit that detects the conveying state (stop) of the article 2 in point A of the conveyance path L2, that is, a circuit for logically adding the article detection signal of the photoelectric switch 11b of point A and the operation termination signal of a zone that is next downstream of the zone of point A that is outputted from the second control device 8.

The timer 43 (the set time of the timer is, for example, 10 sec) inputs the operation termination signal of the zone of point B of the conveyance path L2 that is outputted from the second control device 8 and detects the operation termination time of the zone of point B of the conveyance path L2.

The timer 44 (the set time of the timer is, for example, several seconds) detects the time that elapsed since the input of the detection signal of the photoelectric switch 11b' of the point B of the conveyance path L2, that is, the stop time in which the article 2 is stopped in point B of the conveyance path L2.

The timer 45 (the set time of the timer is, for example, 10 sec) inputs the operation termination signal of the zone of point B of the conveyance path L1 that is outputted from the first control device 7 and detects the operation termination time of the zone of point B of the conveyance path L1.

The timer 46 (the set time of the timer is, for example, several seconds) detects the time that elapsed since the input of the detection signal of the photoelectric switch 11a' of the point B of the conveyance path L1, that is, the stop time in which the article 2 is stopped in point B of the conveyance path L1.

The AND 47 determines whether or not the article 2 is carried and conveyed out by the conveyance path L1 alone based on the logical product of the output signal (stop state of the article 2 in the point A of the conveyance path L1) of the AND 41 and the operation signal (state in which the article 2 has not stopped in point B of the conveyance path L2) of the timer 43.

The AND 48 determines whether or not the article 2 is carried out and conveyed out by the conveyance path L2 alone based on the logical product of the output signal (stop state of the article 2 in the point A of the conveyance path L2) of the AND 42 and the operation signal (state in which the article 2 has not stopped in point B of the conveyance path L1) of the timer 45.

The timer 49 detects the time that elapsed after the article 2 has been detected to be carried out and conveyed out by the conveyance path L1 alone, that is, takes the output signal of AND 47 as an input.

The timer 50 detects the time that elapsed after the article 2 has been detected to be carried out and conveyed out by the conveyance path L2 alone, that is, takes the output signal of AND 48 as an input.

The OR 53 takes a logical sum of the operation signal of the timer 49 that is actuated when the time that elapsed after the article 2 has been detected to be carried out and conveyed out by the conveyance path L1 alone exceeds the prescribed interval and the operation signal of the timer 44 that is actuated when the interval in which the article 2 was stopped in point B of the conveyance path L2 exceeds the prescribed interval.

The OR 54 takes a logical sum of the operation signal of the timer 50 that is actuated when the time that elapsed after the article 2 has been detected to be carried and conveyed out by the conveyance path L2 alone exceeds the prescribed interval and the operation signal of the timer 46 that is actuated when the interval in which the article 2 was stopped in point B of the conveyance path L1 exceeds the prescribed interval.

The RS flip-flop 51 is set by the output signal of the AND 47, reset by the output signal of the OR 53, and outputs the output signal in a set mode as a first control signal for carrying out and conveying out the article 2 by the conveyance path L1 alone.

The RS flip-flop 52 is set by the output signal of the AND 48, reset by the output signal of the OR 54, and outputs the output signal in a set mode as a second control signal for carrying out and conveying out the article 2 by the conveyance path L2 alone.

The AND 55 is a logical AND circuit that is actuated when the output signal of the RS flip-flop 51 is OFF and the output signal of the RS flip-flop 52 is OFF, that is, outputs a third control signal for carrying out and conveying out the article 2 by using the two conveyance paths L1, L2.

Thus, article detection signals from the photoelectric switches 11a, 11b, article detection signals from photoelectric switches 11a', 11b', an operation termination signal of the zone next downstream of the zone of point A, and an operation termination signal of the zone of point B are inputted, the conveying states of the article 2 in point A and point B in the accumulation conveyor 3A, 3B are detected, that is, the retention state of the article 2 in point A and the state in which the article 2 is not conveyed in point B are detected, and any of the first control signal for carrying out and conveying out the article 2 by the conveyance path L1 alone, the second control signal for carrying out and conveying out the article 2 by the conveyance path L2 alone, and the third control signal for carrying out and conveying out the article 2 by using the two conveyance paths L1, L2 are outputted to the first control device 7, second control device 8, first control unit 9A, and second control unit 9B, respectively.

As shown in FIG. 3, if a first control signal that causes the article 2 to be carried out and conveyed out by the conveyance path L1 alone is outputted, the carry-out of article 2 is conducted, the accumulation conveyor 3B, front upstream conveyor 14B, and rear upstream conveyor 15B in the conveyance path L2 are speed controlled so that the conveying speed of each conveyor become constant, and the operation of the front midstream conveyor 18B and rear midstream conveyor 19B is stopped. Then, the accumulation conveyor 3A, front upstream conveyor 14A, and rear upstream conveyor 15A are speed controlled so that the conveying speed of each conveyor become constant, the rear upstream conveyor 15A is article spacing controlled so that the spacing of article 2 becomes 320 mm, which is narrower than the prescribed spacing (666 mm), and the rear midstream conveyor 19A is carry-out controlled so that the article 2 is carried out to the transfer unit 5.

Furthermore, if a second control signal that causes the article 2 to be carried out and conveyed out only by the conveyance path L2 is outputted, the carry-out of article 2 is not conducted, the accumulation conveyor 3A, front upstream conveyor 14A, and rear upstream conveyor 15A in the conveyance path L1 are speed controlled so that the conveying speed of each conveyor becomes constant, and the operation of the front midstream conveyor 18A and rear midstream conveyor 19A is stopped. Then, the accumulation conveyor 3B, front upstream conveyor 14B, and rear upstream conveyor 15B are speed controlled so that the conveying speed of each conveyor becomes constant, the rear upstream conveyor 15B is article spacing controlled so that the spacing of article 2 becomes 320 mm, which is narrower than the prescribed spacing (666 mm), and the rear midstream conveyor 19B is carry-out controlled so that the article 2 is carried out to the transfer unit 5.

Furthermore, if a third control signal that causes the article 2 to be carried out and conveyed out by the two conveyance paths L1 and L2 alone is outputted, the accumulation conveyors 3A, 3B, front upstream conveyors 14A, 14B, and rear upstream conveyors 15A, 15B are speed controlled so that the conveying speed of each conveyor becomes constant, the front midstream conveyors 18A, 18B and rear midstream conveyors 19A, 19B are caused to operate at a predetermined speed, and the rear upstream conveyor 15A and the rear upstream conveyor 15B are article spacing controlled so that the spacing of article 2 becomes 666 mm, which is the prescribed spacing. If the third control signal is inputted, the rear upstream conveyors 15A, 15B and the rear midstream conveyors 19A, 19B are stopped at the prescribed timing, and then article spacing control and carry-out control are executed.

The fourth control device 10 determines the convey-out state of the rear midstream conveyors 19A, 19B by the convey-out signal inputted from the first control unit 9A and second control unit 9B and controls the movable bodies 31A, 31B in the transfer unit 5 so that they correspond to the length of each piece of article 2 based on the article length data also inputted from the first control unit 9A and second control unit 9B.

Operations performed in the above-described implementation mode will be described below.

(Control (1))

As shown in FIG. 1, when article 2 is conveyed in a usual state in points B of the accumulation conveyors 3A, 3B (the timers 43, 45 are timed up and do not operate), the spacing between article 2 conveyed by the accumulation conveyors 3A, 3B narrows, the article 2 is determined to flow orderly, and a control is conducted that relates to conveying the article 2 by using the above-described two conveyance paths L1, L2. Thus, a speed control by which the article 2 conveyed in from the upstream side is conveyed at a constant speed of 65 mm/min by the accumulation conveyors 3A, 3B, a speed control by which the article 2 conveyed in from the accumulation conveyors 3A, 3B is conveyed at a constant speed of 65 mm/min by the front upstream conveyors 14A, 14B, and a speed control by which the article 2 conveyed in from the front upstream conveyors 14A, 14B is conveyed at a constant speed of 75 mm/min by the rear upstream conveyors 14A, 14B are conducted and also a article spacing control by which the article 2 is conveyed with a constant spacing of 666 mm is conducted.

Here, this spacing of 666 mm between the pieces of article 2 is calculated from a conveying speed of 100 m/min of the rear midstream conveyors 19A, 19B because a spacing of 666 mm between the pieces of article 2 is necessary in the rear midstream conveyors 19A, 19B prior to carrying the article to the transfer unit 5.

Furthermore, the article 2 that was conveyed at a constant speed in the accumulation conveyors 3A, 3B, front upstream conveyors 14A, 14B, and rear upstream conveyors 15A, 15B, as described above, and was article spacing controlled at the rear upstream conveyors 15A, 15B is conveyed via the front midstream conveyors 18A, 18B to the rear midstream conveyors 19A, 19B, while the spacing between pieces of article 2 is maintained at 666 mm, the carry-out control is conducted at the rear midstream conveyors 19A, 19B, and the article is parallel transferred from the conveyance path L1 and conveyance path L2 to the conveyance path L3 with the movable bodies 31A, 31B at the transfer unit 5 and conveyed to the downstream conveyor 6.

As a result, the speed control is so conducted that the conveying speeds of the accumulation conveyors 3A, 3B, front upstream conveyors 14A, 14B, and rear upstream conveyors 15A, 15B are constant. At the same time, the article spacing control is conducted such that the spacing between pieces of article 2 in the same conveyance path that are conveyed out from the rear upstream conveyor 15A and rear upstream conveyor 15B is 666 mm, so that when the pieces of article 2 conveyed out from the rear upstream conveyor 15A and rear upstream conveyor 15B are alternately conveyed in to the transfer unit 5 and joined, the pieces of article are conveyed to the lower conveyor 6 with a spacing between the pieces of article 2 in the transfer unit 5 of 320 mm. Therefore, for example, if the conveying speed of the downstream conveyor 6 is taken as 120 m/min, the standard length of the article 2 is taken as 500 mm, and the spacing between the pieces of article is taken as 320 mm, then the number of pieces (pc) of article 2 of the standard article length conveyed to the downstream conveyor 6 per 1 hour (H) will be:

120 (m/min)×1000 (mm)×60 (min)/{500 (mm)+320 (mm)}=8780 (pc/H).

(Control (2))

As shown in FIG. 2, when the photoelectric switch 11a located in an accumulation conveyor in any one conveyance path, for example in the conveyance path L1, detects the article 2, the conveyance of the article 2 in the zone next downstream of the zone where this photoelectric switch 11a is provided is stopped, the zone of the position of the photoelectric switch 11b' on the downstream side of the conveyance path L2 stops for a long time (for example, 10 sec), and the article 2 is not conveyed (when the timer 43 is actuated), a decision is made that the spacing between the pieces of article 2 conveyed by the accumulation conveyor 3A in the conveyance path L1 decreased (the article 2 is retained in the conveyance path L1) and the spacing between the pieces of article 2 conveyed by the accumulation conveyor 3B in the conveyance path L2 increased (the article 2 practically does not flow in the conveyance path L2), and a control is conducted which relates to the conveyance of the article 2 only in any one conveyance path. Thus, the article spacing control of the rear upstream conveyor 15B and the carry-out control of the rear midstream conveyor 15B are promptly stopped (drive control of the midstream conveyor 13B is promptly stopped), and there are conducted a speed control such that the conveying speed of the article 2 conveyed in from the upstream side is changed from a constant speed of 65 m/min to a high speed of 75 m/min in the accumulation conveyor 3A in the conveyance path L1, a speed control such that the conveying speed of the article 2 conveyed in from the accumulation conveyor 3A is changed from a constant speed of 65 m/min to a high speed of 75 m/min in the front upstream conveyor 14A, and a speed control such that the conveying speed of the article 2 conveyed in from the front upstream conveyor 14A is changed from a constant speed of 75 m/min to a high speed of 85 m/min in the rear upstream conveyor 15A. Also, in 1 sec an article spacing control is conducted such that the article 2 is conveyed with a spacing of 320 mm, which is narrower than the predetermined spacing of 666 mm. Art this time, the article 2 conveyed in from the upstream side is conveyed at a constant speed in the accumulation conveyor 3B, front upstream conveyor 14B, and rear upstream conveyor 15B in the conveyance path L2. The article 2 accumulates in the front upstream conveyor 14B and rear upstream conveyor 15B and the conveyors are stopped.

Here, this spacing of 320 mm of the article 2 was calculated from 120 m/min, which is the conveying speed of the transfer unit 5, because a spacing of the article of 320 mm is necessary in the transfer unit 5.

Further, as described above, each piece of article 2 that was conveyed at a constant speed in the accumulation conveyor 3A, front upstream conveyor 14A, and rear upstream conveyor 15A and was article spacing controlled in the rear upstream conveyor 15A is conveyed to the rear midstream conveyor 19A via the front midstream conveyor 18A, while maintaining the spacing between the pieces of article 2 of 320 mm. A carry-out control is conducted in the rear midstream conveyor 19A, the article pieces are parallel moved from the conveyance path L1 to the conveyance path L3 by the movable body 31A in the transfer unit 5 and conveyed to the downstream conveyor 6.

As a result, the drive control of the midstream conveyor 13B is promptly stopped, that is, the article spacing control of the upstream conveyor 12B and carry-out control of the midstream conveyor 13B are promptly stopped, speed control is so conducted that the conveying speed of the accumulation conveyor 3A, front upstream conveyor 14A, and rear upstream conveyor 15A becomes a respective constant speed, and when the article 2 conveyed out from the rear upstream conveyor 15A is conveyed to the transfer unit 5, the article spacing control providing for a spacing of 320 mm between the pieces of article 2 conveyed out from the rear upstream conveyor 15A is conducted so that the article is conveyed to the downstream conveyor 6 with a spacing between the pieces of article 2 in the transfer unit 5 of 320 mm. Therefore, for example, if the conveying speed of the downstream conveyor 6 is taken as 120 m/min, the standard length of the article 2 is taken as 500 mm, and the spacing between the pieces of article is taken as 320 mm, then the number of pieces (pc) of article 2 of the standard article length conveyed to the downstream conveyor 6 per 1 hour (H) will be:

120 (m/min)×1000 (mm)×60 (min)/{500 (mm)+320 (mm)}=8780 (pc/H).

(Control (3))

As shown in FIG. 1, after the above-described control (2) has been executed and the prescribed time (for example, 30 sec) has elapsed thereafter (when the timer 49 was actuated), that is, after the article spacing control of the upstream conveyor 12B of the conveyance path L2 and the carry-out control of the midstream conveyor 13B were stopped for the prescribed time, or when the state in which the downstream photoelectric switch 11$b'$ provided at the accumulation conveyor 3B in the conveyance path L2 detects the same article 2 for a long time starts to be continuous (when timer 44 is actuated), a decision is made that a large number of pieces of article 2 have started accumulating in the accumulation conveyor 3B, front upstream conveyor 14B, and rear upstream conveyor 15B in the conveyance path L2 and a control is conducted which relates to conveyance of the article 2 by using both above-described conveyance paths L1, L2. Thus, the rear upstream conveyors 15A, 15B and rear midstream conveyors 19A, 19B are stopped for the prescribed time and then there are conducted a speed control changing the conveying speed in the accumulation conveyor 3A in the conveyance path L1 from a high speed of 75 m/min to a constant speed of 65 m/min, and a speed control such that the conveying speed is changed from a high speed of 75 m/min to a constant speed of 65 m/min in the front upstream conveyor 14A and from a high speed of 85 m/min to a constant speed of 75 m/min in the rear upstream conveyor 15A. At this time, a speed control to a constant speed of 65 m/min is conducted in the front upstream conveyor 14B in the conveyance path L2, a speed control to a constant speed of 75 m/min is conducted in the rear upstream conveyor 15B, a drive control to a prescribed speed of 85 m/min is conducted in the front midstream conveyor 18B, a drive control to a prescribed speed of 100 m/min is conducted in the rear midstream conveyor 19B, and after 1 sec, a article spacing control providing for a constant spacing of 666 mm between the pieces of article 2 is conducted in the rear upstream conveyors 15A, 15B. Subsequent operations are identical to those of control (1).

As a result, the speed control is so conducted that the conveying speeds of the accumulation conveyors 3A, 3B, front upstream conveyors 14A, 14B, and rear upstream conveyors 15A, 15b again become the respective constant speeds, the drive control is so conducted that the conveying speed of the front midstream conveyor 18$b$ and rear midstream conveyor 19B again becomes the constant speed, and the article spacing control is so conducted that the spacing between the pieces of article 2 carried out from the rear upstream conveyor 15A and rear upstream conveyor 15B again becomes 666 mm so that the article 2 is conveyed to the downstream conveyor 6 with a spacing between the pieces of article in the transfer unit 5 of 320 mm when the pieces of article 2 carried out from the rear upstream conveyor 15A and rear upstream conveyor 15$b$ are alternately conveyed in to the transfer unit 5 and joined therein. Therefore, for example, if the conveying speed of the downstream conveyor 6 is taken as 120 m/min, the standard length of the article 2 is taken as 500 mm, and the spacing between the pieces of article 2 is taken as 320 mm, then the number of pieces (pc) of article 2 of the standard article length conveyed to the downstream conveyor 6 per 1 hour (H) will be:

120 (m/min)×1000 (mm)×60 (min)/{500 (mm)+320 (mm)}=8780 (pc/H).

As described hereinabove, in the present embodiment, the speed control of the conveying speed in the accumulation conveyors 3A, 3B, front upstream conveyors 14A, 14B, and rear upstream conveyors 15A, 15B and the article spacing control of the spacing between the respective articles 2 in the rear upstream conveyors 15A, 15B are changed appropriately depending on whether the article 2 is conveyed in a plurality of conveyance paths L1, L2 or the flow of article 2 in any one conveyance path L2 (L1) is stopped and the article 2 is conveyed only in one conveyance path L1 (L2). As a result, in any of the above-described cases, the number of pieces of article 2 carried out to the downstream conveyor 6 within the prescribed time can be the same and, therefore, the conveying capacity can be maintained.

Furthermore, in the present embodiment, the speed control of the conveying speed in the accumulation conveyors 3A, 3B, front upstream conveyors 14A, 14B, and rear upstream conveyors 15A, 15B and the article spacing control of the spacing between the pieces of article 2 in the rear upstream conveyors 15A, 15B are changed appropriately according to the conveying state of article 2 in point A and point B of the conveyance path L1 and conveyance path L2. As a result, the number of pieces of article 2 carried out to the downstream conveyor 6 within the prescribed time can be the same regardless of the conveying state in each conveyance path and, therefore, the conveying capacity can be maintained.

Furthermore, with the above-described embodiment, a third control signal is inputted and the rear upstream conveyors 15A, 15B and rear midstream conveyors 19A, 19B are stopped for the prescribed time, that is, the article spacing control and carry-out control conducted when the article 2 is conveyed only in one conveyance path are stopped for the prescribed time and then the article spacing control and carry-out control based on a constant speed are executed. As a result, the control (conveying at a high speed and carry out) conducted when the article 2 is conveyed in any one conveyance path is temporarily stopped, thereby making it possible to match easily the control operations based on a constant speed of a plurality of conveyance paths L1, L2 and to convey the article orderly in a plurality of conveyance paths L1, L2. Furthermore, only the rear upstream conveyor 15A or 15B and the rear midstream conveyor 19A or 19B of the conveyance path where the first control signal was changed to the third control signal may be stopped and the article 2 can be conveyed by a plurality of conveyance paths L1, L2 in a similar manner.

Furthermore, with the present embodiment, the article spacing control is conducted by detecting the article 2 with the first photoelectric switches 17A, 17B, so that the spacing between the pieces of article 2 in the upstream conveyors 12A, 12B are equal to or narrower than the prescribed spacing, and the carry out control is conducted by detecting the article 2 with the second photoelectric switches 21A, 21B, so that the article 2 conveyed from the upstream conveyors 12A, 12B is carried out with any above-described spacing, while taking into account the length of article 2, in the midstream conveyors 13A, 13B. As a result, the article 2 can be conveyed to the transfer unit 5 after the desired spacing is provided between the pieces of article.

In the present embodiment, control (2) was explained with reference to the case where the article 2 accumulated in the conveyance path L1 and the article 2 practically did not flow in the conveyance path L2, but the same control can be also conducted when the article 2 is accumulated in the conveyance path L2 and the article practically does not flow in the conveyance path L1.

Furthermore, in the present embodiment, conducting the above-described control (2) makes it possible to maintain the conveying capability even when a trouble occurs in any one conveyance path and the article 2 cannot be conveyed in that path.

In the present embodiment, the case of using two conveyance paths L1, L2 was explained, but there may be three or more paths.

Furthermore, in the present embodiment, the accumulation of article 2 in point A of the accumulation conveyor in any one conveyance path was confirmed when the photoelectric switches 11a, 11b in the conveyance paths L1, L2 detected the article 2 and that the article 2 is conveyed in the zone next downstream of the zone where the photoelectric switches 11a, 11b were provided is stopped. The fact that the article 2 did not flow in point B of the accumulation conveyor in the other conveyance path was confirmed (timers 43, 45 were actuated) when the zone in the position of photoelectric switches 11b', 11a' on the downstream side of conveyance paths L2, L1 stopped for a long time (for example, for 10 sec), but the accumulation of article 2 in point A may be confirmed when the upstream photoelectric switches 11a, 11b provided in the accumulation conveyors 3A, 3B of the conveyance paths L1, L2 detect the same article 2 for a long time, and the fact that the article 2 does not flow in point B may be detected when the photoelectric switches 11b', 11a' provided downstream of the upstream photoelectric switches 11b, 11a provided in the accumulation conveyors 3B, 3A in the conveyance paths L2 does not detect the article 2 continuously (the state in which the article 2 is conveyed without a stop).

What is claimed is:

1. An article joining system comprising:
   a plurality of conveyance paths for conveying an article; and
   a joining apparatus for joining and conveying out the article that is conveyed by the plurality of conveyance paths,
   each of said plurality conveyance paths comprising:
   an accumulation conveyor comprising in a row a plurality of zones for successively accumulating therein articles conveyed in from the upstream side and successively feeding out the accumulated articles therefrom to the downstream side, and conducting a speed control for conveying the articles accumulated in the zones at a constant speed or a speed higher than the constant speed; and
   a carry-out conveyor connected to a downstream end of the accumulation conveyor, said carry-out conveyor conducting a speed control for conveying the articles conveyed in from the accumulation conveyor at a constant speed or a speed higher than the constant speed, conducting an article spacing control for conveying the articles with a prescribed spacing or a spacing narrower than the prescribed spacing between each articles, judging a conveyance state of the articles to said joining apparatus from each of said conveyance paths, thereby conducting a carry-out control for carrying out the articles to the joining apparatus, said article joining system further comprising a control device for conducting control of the accumulation conveyor and carry-out conveyor constituting each conveyance path, wherein said control device operates to:

when articles are conveyed by the plurality of conveyance paths, conduct a speed control of the accumulation conveyor at the constant speed, conduct a speed control of the carry-out conveyor at the constant speed, and conduct an article spacing control of the carry-out conveyor at the prescribed spacing; and when the articles are conveyed only by any one of the conveyance paths, stop the article spacing control and carry-out control of the carry-out conveyor in the conveyance path where the conveyance of articles is not conducted, conduct a speed control of the accumulation conveyor at the higher speed in the conveyance path where the conveyance of articles is conducted, conduct a speed control of the carry-out conveyor at the higher speed in the conveyance path where the conveyance of articles is conducted, and conduct an article spacing control of the carry-out conveyor with a spacing narrower than the prescribed spacing between the articles.

2. The article joining system according to claim 1, wherein each of said accumulation conveyors comprises a detection unit for detecting the passage of articles in each of the zones, and said control device operates to:

when said detection unit in a prescribed upstream zone located upstream of said accumulation conveyor in any one of said conveyance paths detects an article and the article conveyance in a prescribed downstream zone located downstream of the upstream zone stops, and the article conveyance is not conducted for a long time in the downstream zone of said accumulation conveyor in another of said conveyance paths, judge that the spacing between the articles conveyed by the accumulation conveyor in any one of said conveyance paths has narrowed and the spacing between the articles conveyed by the accumulation conveyor in another of said conveyance paths has widened, and conduct a speed control and an article spacing control that are conducted when articles are conveyed only in any one of said conveyance paths; and when said detection unit in the downstream zone of said accumulation conveyor in said another conveyance path continuously detects the same article for a long time, judge that the spacing between the articles conveyed by said accumulation conveyor in said another conveyance path has narrowed, and conduct a speed control and an article spacing control that are conducted when articles are conveyed in said plurality of conveyance paths.

3. The article joining system according to claim 2, wherein after stopping for a prescribed time the article spacing control and carry-out control of said carry-out conveyor that are conducted for conveying articles only by any one of said conveyance paths, the control device conducts the speed control and article spacing control that are conducted when articles are conveyed by said plurality of conveyance paths.

4. The article joining system according to claim 1, wherein each of said carry-out conveyors comprises:

an upstream conveyor connected to the downstream side of the accumulation conveyor, and conducting an article spacing control so that the articles successively conveyed from said accumulation conveyor are conveyed to the downstream side with a prescribed spacing or a spacing narrower than the prescribed spacing between each articles;

a midstream conveyor connected to the downstream side of the upstream conveyor, and judging the state of conveyance of articles from each of said conveyance paths to said joining apparatus, thereby conducting a carry-out control so that the articles conveyed from the upstream conveyor are carried out to the joining apparatus with a prescribed spacing or a spacing narrower than the prescribed spacing between the articles;

a first detection device for the carry-out conveyor, provided downstream of the upstream conveyor and detecting the spacing of the articles conveyed out from the upstream conveyor; and a second detection device for the carry-out conveyor, provided downstream of the midstream conveyor and detecting the length of the articles conveyed out from the midstream conveyor.

* * * * *